F. WHITMAN.
EMERGENCY NUT.
APPLICATION FILED SEPT. 9, 1911.

1,071,841.

Patented Sept. 2, 1913.

Inventor
Frank Whitman,

Witnesses
R. B. Lewis
Wm. Dyson

By Chas. F. Schmelz
Attorney

UNITED STATES PATENT OFFICE.

FRANK WHITMAN, OF YPSILANTI, MICHIGAN.

EMERGENCY-NUT.

1,071,841.　　　　　Specification of Letters Patent.　　Patented Sept. 2, 1913.

Application filed September 9, 1911. Serial No. 648,458.

*To all whom it may concern:*

Be it known that I, FRANK WHITMAN, a citizen of the United States, and a resident of Ypsilanti, in the county of Washtenaw and State of Michigan, have invented a new and useful Emergency-Nut, of which the following is a full, clear, and exact specification, such as will enable any one to understand and use the invention as herein described.

This invention relates to nuts for bolts, screws, and the like, and it has for one of its objects the provision of what may be termed a "blank" nut which is adapted to be used on bolts of substantially the same diameter but having threads of different pitch.

The invention has, furthermore, for its object, the provision of a nut which may have a thread cut therein for a portion of its length, or entirely through the same, but which has a portion of this thread or its unthreaded length "filled-in" by some comparatively soft metal which permits the bolt to be forced thereinto and thus to jam or compress this soft metal into a hard condition which will be in close frictional contact with the threaded surface of the bolt.

Figure 1:
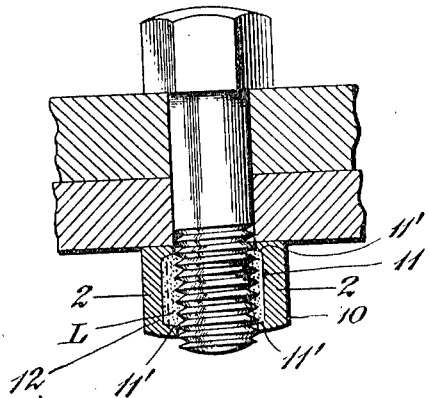
Figure 2:
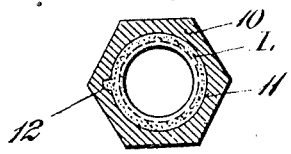
Figure 3:
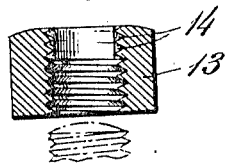
Figure 4:
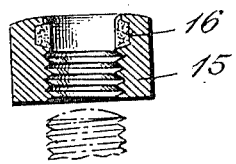

The invention has been clearly illustrated in the accompanying drawing, in which similar characters denote like parts throughout, and in which:

Figure 1 represents a bolt having a nut of my improved construction thereon; Fig. 2 is a horizontal section of the nut, on line 2—2 of Fig. 1, the nut being shown in its "blank" or unthreaded condition; Fig. 3 illustrates a nut having the last few threads "filled-in"; and, Fig. 4 shows another modification.

Briefly stated, the present invention has for its particular object to provide a nut which may be used on any one of many different bolts of substantially the same diameter, but regardless of what the thread-pitch of such bolts may be. In fact the device constitutes what may well be termed an "emergency" nut which can be readily applied for temporary use when a regular nut should, for some reason or other, become useless or lost. It is a common practice among builders of machinery, vehicles, etc., to use bolts having threads of different pitch from the regular U. S. "standard." Especially among builders of automobiles, wagons and trucks this practice is almost universally indulged in, so that, if a nut be lost, it is a practically hopeless task to find another nut exactly similar to take its place; again it is hardly practicable to carry a complete stock of nuts of assorted sizes and thread-pitches, to provide for contingencies which may, or may not, arise. For this reason it is my chief aim to provide a nut which may be fitted to any bolt, within certain limits, irrespective of what the pitch of the thread may be. I accomplish this object, in a generic way, by employing a nut of chambered or shell form, the spare space being filled with a soft metal which is capable of being swaged or compressed, and which will permit the bolt-thread to "crowd" its way into the same, or which may be cut by a knife, or other sharp instrument, to an approximate fit.

Referring first to Fig. 1, it will be noted that the nut 10 has an annular chamber 11 which primarily is filled with a soft metal L, such as lead, babbitt or the like, this metal projecting toward the center of the nut so as to leave an aperture somewhat smaller than the screw-thread of a bolt of corresponding size (see Fig. 2). The upper and lower end walls of this chamber are slightly beveled, as shown at 11', so that when a bolt is forced into this soft metal L, the latter will be crowded by displacement into firm contact with the bolt at those points especially, and in fact, the metal will be very much solidified or compressed during the screwing-in operation of the bolt. Inasmuch as the nut-shell is as usual of steel or wrought or cast iron, and since the soft metal does not, of itself, adhere to the inner chamber-wall sufficiently to prevent its turning around in the shell, I provide a groove 12 which is also filled by the soft metal when the latter is poured or otherwise entered into the shell, and forms an integral part thereof, so that this metal in the groove serves as a key-member to prevent movement of the soft metal lining relatively to the shell.

In Fig. 3 I have shown a modification, the nut 13 having been primarily screw-threaded to fit a certain pitch bolt. As is well known, nuts in general fit sometimes very tightly and at other times they are so loose in the threads that they can be readily shaken off. It is therefore a part of my invention to provide a threaded nut of a given pitch which, when screwed onto the bolt will be assuredly tight, and for this reason I fill a portion of the nut-threads with the softer metal, as indicated at 14, so that when the bolt is then screwed into place, the soft metal will be swaged by the bolt-threads and a tight union between the bolt and nut will result.

In Fig. 4 I have applied the chamber principle of Fig. 1 to a partially threaded nut 15, the soft metal filling being contained in a chamber 16 above the screw threads, in which case the operation remains substantially the same as in Figs. 1 and 2.

I claim—

A nut comprising a body provided intermediate its ends with an annular recess having upper and lower end walls, a soft metal annulus immovable in the body and completely filling said recess and having a smooth bore slightly smaller in diameter than the outside diameter of the threads of the bolt with which it is to be engaged, whereby when said nut is screwed onto the bolt, the bolt-threads will force their way into the filler and displace the thread-engaging portions of the latter, and form a true-fitting thread therein.

In testimony whereof I have signed this specification in the presence of two subscribing witnesses.

FRANK WHITMAN.

Witnesses:
 LOUIS R. KILIAN,
 FLORA B. FORBES.